United States Patent [19]

Steigerwald

[11] Patent Number: 4,460,949
[45] Date of Patent: Jul. 17, 1984

[54] HIGH FREQUENCY PARALLEL RESONANT DC-DC CONVERTER

[75] Inventor: Robert L. Steigerwald, Scotia, N.Y.

[73] Assignee: General Electric Company, Schenectady, N.Y.

[21] Appl. No.: 429,761

[22] Filed: Sep. 30, 1982

[51] Int. Cl.³ .................................. H02M 3/315
[52] U.S. Cl. .................................. 363/28; 363/96; 363/136; 363/139
[58] Field of Search .................... 363/27, 28, 96, 97, 363/98, 132, 135, 136, 139

[56] References Cited

U.S. PATENT DOCUMENTS

| | | | |
|---|---|---|---|
| 3,558,915 | 1/1971 | Wood et al. | 363/97 X |
| 3,609,511 | 9/1971 | Risberg | 363/135 |
| 4,024,453 | 5/1977 | Corry | 363/28 |
| 4,143,414 | 3/1979 | Brewster et al. | 363/44 |

FOREIGN PATENT DOCUMENTS 0003114 1/1977 Japan .................................. 363/136

Primary Examiner—William M. Shoop
Attorney, Agent, or Firm—William H. Steinberg; James C. Davis, Jr.; Marvin Snyder

[57] ABSTRACT

A dc-dc converter employs a parallel resonant circuit which is driven by square waves of current. By adjusting the frequency below the resonant point, the voltage on the resonant components can be stepped up. Switching losses in the inverter devices are low since the inverter feeds a lagging load allowing lossless snubber operation which allows the use of lossless snubbers.

9 Claims, 8 Drawing Figures

HIGH FREQUENCY PARALLEL RESONANT DC-DC CONVERTER

Background of the Invention

Cross-Reference to Related Application

This application is related to my copending application Ser. No. 429,761, filed concurrently herewith.

This invention relates to dc-dc converters, and more particularly to a dc-dc converter which employs a current fed parallel resonant circuit.

A dc-dc converter is needed which can step up the input voltage with high efficiency while operating at high frequency (to reduce magnetic component size and capacitor size). As efficiency of conversion is increased, less power need be supplied from the source to the load.

In U.S. Pat. No. 4,143,414 a series resonant converter is described that is used in a three phase silicon controlled rectifier ac-dc converter application. The rectifier and load in the circuit are connected in series with the resonant circuit. Voltage step-up cannot be conveniently be obtained and high frequency operation is also difficult to obtain using silicon controlled rectifiers. In addition, high turn-on switching losses occur since the resonant load must be run at a leading power factor to commutate the silicon controlled rectifier.

It is an object of the present invention to provide a dc-dc converter for operation at high frequencies to reduce reactive component size.

It is a further object of the present invention to provide a dc-dc converter capable of operating with high efficiencies by reducing switching losses.

It is a still further object of the present invention to provide a dc-dc converter which operates in a voltage step-up mode.

Brief Summary of the Invention

In a preferred embodiment of the present invention a resonant dc-dc converter is provided with a current input inverter having gate turn-off switches with reverse voltage blocking ability. The inverter is energized by an external dc power source and the inverter supplies square waves of dc current to a parallel resonant circuit having an inductor and a capacitor. A rectifier is coupled to the output of the parallel resonant circuit to rectify the sine waves of voltage across the resonant circuit to provide a dc output voltage.

A control circuit controls the dc output voltage by varying the frequency at which the inverter switches turn on and off. The control has a summer for comparing a commanded output voltage to the actual output voltage to generate an error signal. A limit circuit assures that the inverter is provided with a lagging load. The limit circuit is responsive to the error signal to limit the voltage supplied to a voltage controlled oscillator so that the switching frequency of the switches is at or below the damped resonant frequency of the resonant circuit to reduce switching losses.

Brief Description of the Drawing

While the specification concludes with claims particularly pointing out and distinctly claiming the present invention, the objects and advantages of the invention can be more readily ascertained from the following description of preferred embodiments when used in conjunction with the accompanying drawing in which:

FIG. 2A shows the waveform of the current supplied to the resonant circuit, FIG. 2B shows the waveform of the current flowing in one of the switching devices in the inverter, FIG. 2C shows the waveform of the voltage across one of the switching devices in the inverter, FIG. 2D shows the waveform of the voltage at the input of the resonant circuit and FIG. 2E shows the waveform of the voltage of the output of the resonant circuit after being rectified;

Detailed Description of the Invention

Figure 1:
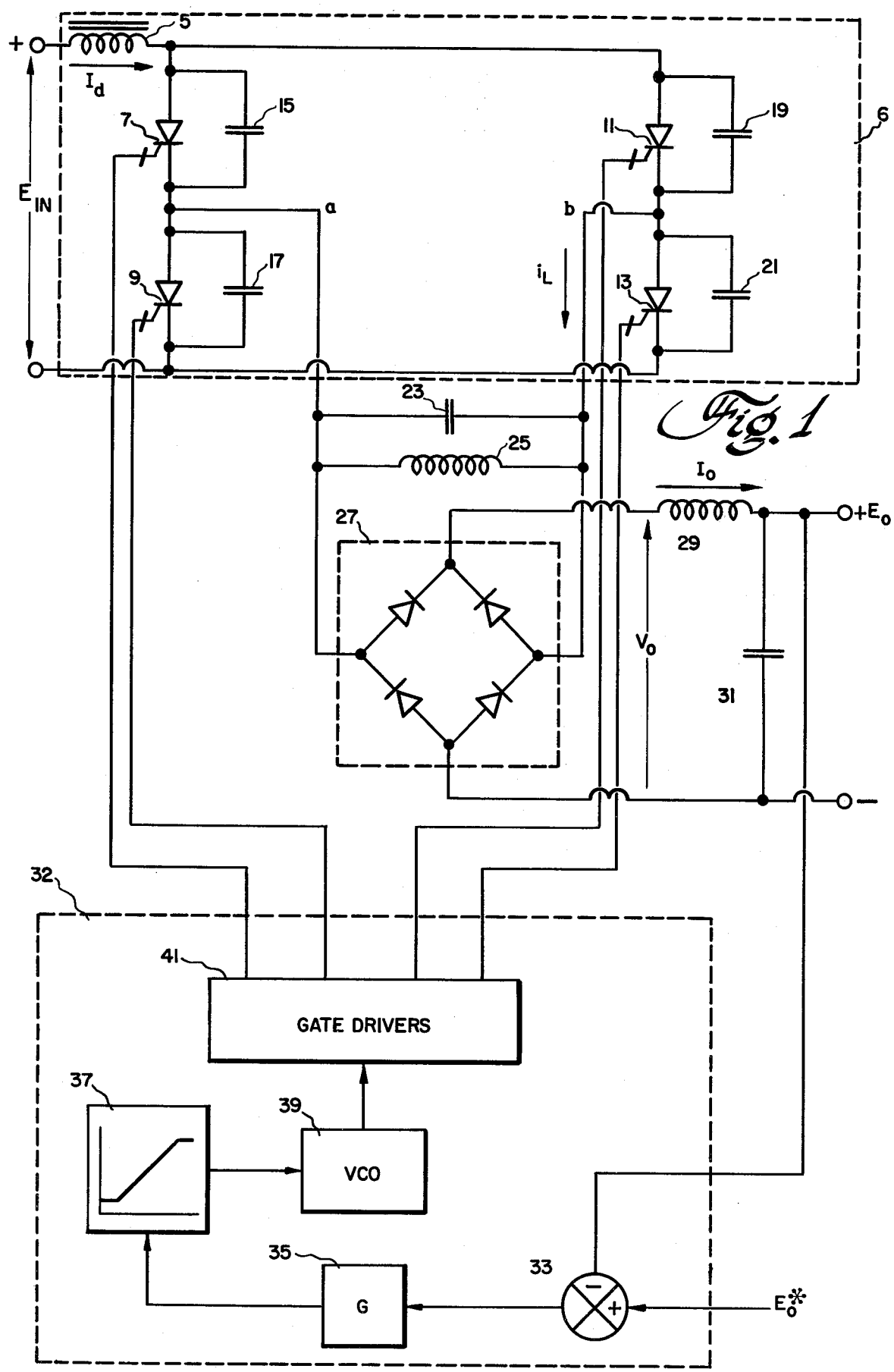
FIG. 1 is a part block diagram part schematic representation of a resonant dc-dc converter in accordance with the present invention.

Referring now to FIG. 1, a current input full bridge resonant dc-dc converter is shown. A dc input current obtained from a chopper or a phase controlled rectifier (not shown) supplies current through an inductor 5 to a full bridge inverter 6 having four switching devices with reverse voltage blocking ability such as a diode in series with a field effect transistor (FET), a diode in series with a bipolar junction transistor or a gate turn-off silicon controlled rectifier (GTO). Four GTOs 7, 9, 11, 13 are shown in the Figure. The full bridge inverter 6 has GTOs 7 and 9 connected in series in a first leg of the bridge and GTOs 11 and 13 connected in series in the second leg of the bridge. Capacitors 15, 17, 19 and 21 are connected in parallel with GTOs 7, 9, 11 and 13 respectively and serve as lossless snubbers. The legs of the inverter 6 are connected between positive and negative rails with the positive rail connected to the inductor 5 and the negative rail to the negative terminal of the current supply (not shown). The output of the inverter is taken between the series connected GTOs 7 and 9, and between the series connected GTOs 11 and 13 and is connected to a resonant circuit comprising the parallel combination of a capacitor 23 and an inductor 25. A full bridge diode rectifier 27 is connected across the resonant circuit. An inductor 29 and filter capacitor 31 are connected in series across the output of the rectifier 27. A dc load can be connected across the capacitor 31. Transformer isolation between source and load can be obtained by substituting the primary winding of a high frequency transformer for inductor 25. The secondary winding of the transformer instead of inductor 25, would be connected to the diode bridge 27. The inductance for the resonant circuit would be obtained from the primary inductance of the transformer.

A control 32 has as an input a commanded dc voltage $E_o^*$ for the dc-dc converter. The commanded voltage is compared to the actual output voltage $E_o$ in a summer 33 to generate an error signal. The error signal is passed through a proportional plus integral regulator 35 to a limit circuit 37. The limit circuit assures that a lagging load is presented to the inverter by allowing the inverter 6 to operate at or below the resonant frequency of the parallel resonant circuit. The output of the limit circuit is connected to a voltage controlled oscillator 39 which provides input signals to gate drivers 41 which alternately switch opposite corners of the inverter.

The operation of FIG. 1 will be described in connection with the waveforms of FIGS 2A-E. A commanded dc output voltage $E_o{}^*$ is compared to the actual output voltage $E_o$ to develop an error signal. The error signal after passing through the proportional plus integral regulator circuit 35, provides an input signal to the limit circuit 37. The limit circuit provides a maximum value in response to a maximum error signal. The maximum value when provided by the limit circuit to the voltage controlled oscillator results in a frequency supplied via the gate drivers to the GTOs that drive the resonant circuit at a damped resonant frequency corresponding to maximum damping from the load. As the error signal from summer 33 decreases, signifying reduced output voltage is called for, the limit circuit decreases the voltage supplied to the voltage controlled oscillator thereby decreasing the frequency supplied to the resonant circuit below the damped resonant frequency. As the frequency is lowered below resonance, with a constant current source supplied to the converter, the voltage across the parallel resonant circuit decreases. Decreased voltage across the resonant circuit results in an decreased voltage to be rectified by the diode bridge and hence a smaller output voltage. The amount of voltage step up for a given frequency is dependent on the amount of damping provided by the rectifier filter and load. The closed loop control adjusts the frequency at which the GTOs are switched to achieve the voltage step up needed to attain the desired output voltage.

Figure 2:
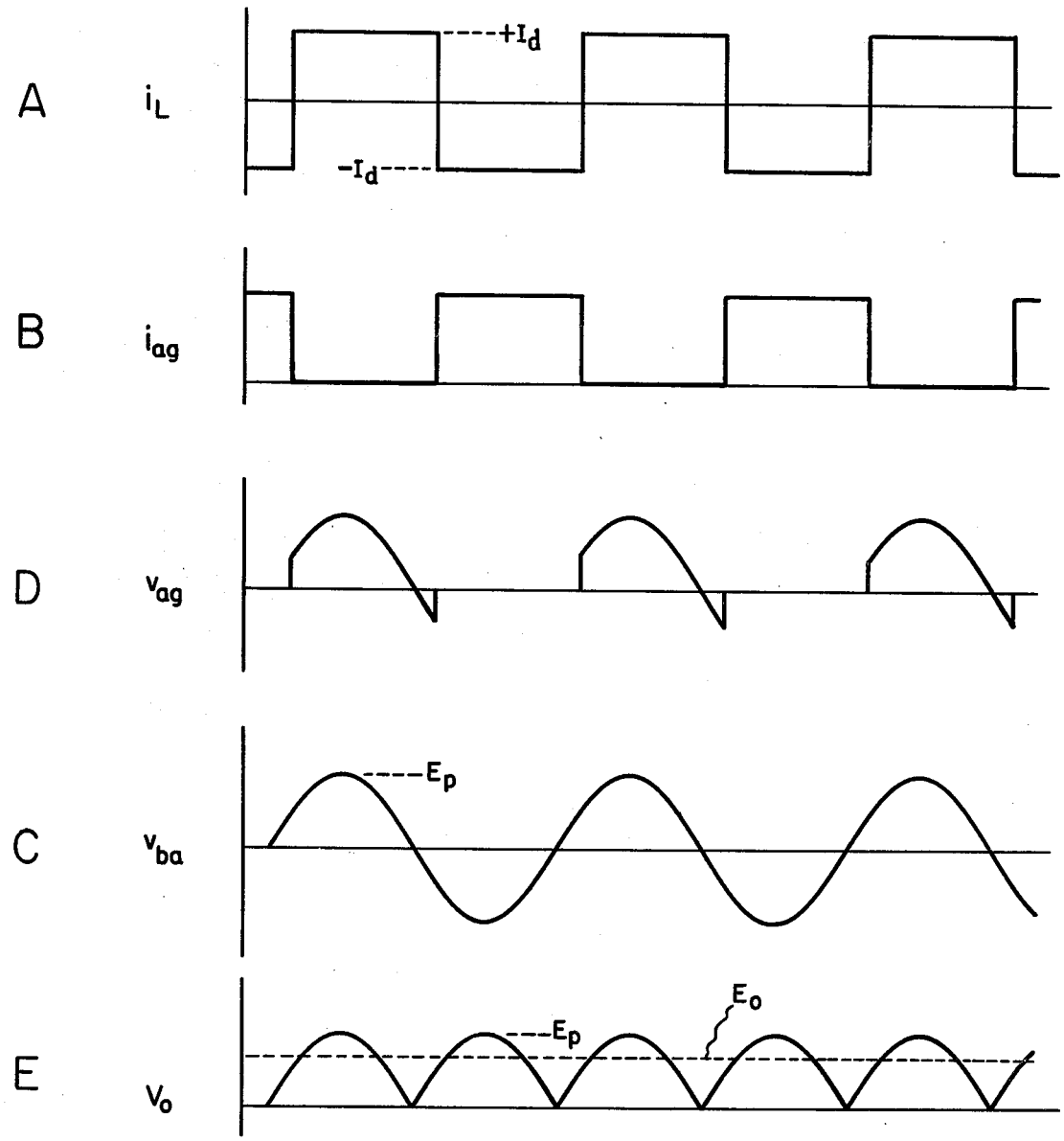
FIGS. 2A-E are waveform diagrams helpful in explaining the operation of FIG. 1.

The gate drivers switch opposite corners of the inverter resulting in square waves of current $i_L$, shown in FIG. 2A, being supplied to the resonant circuit. The waveform of the current through a GTO is shown in FIG. 2B. The square waves of current result in approximate sinusoidal voltages across the resonant circuit as shown in FIG. 2C which should result in easier electromagnetic interference filtering. The resonant circuit is driven at a frequency such that a lagging load is presented to the inverter 6 between points a and b, i.e., the current $i_L$ lags the voltage $V_{ab}$ and the GTOs are turned off by gate control rather than by anode current commutation. The lagging load is obtained by operating the inverter at frequencies at or below the damped resonant frequency of the resonant circuit. The values of the inductor and capacitor in the resonant circuit are selected to have a resonant frequency of thousands of hertz. The power to be handled by the converter determines the ratings of the switching devices. The switching times of the switching devices determine the attainable switching frequencies. High frequencies (20-30 KHz) permit smaller reactive components to be used. The limit circuit 37 assures that a frequency higher than the damped resonant frequency will not be commanded. Operating the inverter with a lagging load results in switching device waveforms that are opposite those normally encountered in thyristor inverters. In the present invention, there is negative voltage across the GTOs just before they conduct and they block voltage immediately when they are turned off by gate control as shown in FIG. 2D. Thus when the GTOs are gated on, there are no turn-on switching losses in the GTOs. Also, fast device reverse recovery characteristics are not needed since reverse voltage is not suddenly applied to a switching device to turn it off as in a thyristor circuit. To commutate the inverter, the two incoming GTOs 7 and 11 or 9 and 13) are gated on slightly before the outgoing GTOs turn off. This overlap is accomplished by gating the appropriate GTOs on and off, respectively, at the same time. The GTOs have a storage time so that when they receive the turn off signal there will be a delay until they turn off. The turn on delay for the GTOs is negligible compared to the turn off delay. During the overlap time, the incoming GTOs will not conduct since they have negative anode-to-gate voltage applied to them as can be seen in FIG. 2D. Only after the outgoing GTOs have turned off will this negative voltage begin to reverse polarity, and the incoming GTOs conduct. Simple lossless snubbing can be employed since there are no switching losses at turn on. A small capacitor 15, 17, 19 and 21 is placed across each GTO 7, 9, 11 and 13, respectively to reduce turn-off dissipation. Since a resistor is not needed in series with the snubber capacitor, no snubber dissipation results, that is, a lossless snubber action results allowing relatively large snubbers to be used, which in turn results in low GTO power dissipation and low voltage overshoots at device turn-off. Minimum voltage step up is obtained at the resonant frequency of the resonant circuit with increasing step-up at lower frequencies. Decreasing the frequency of the inverter results in an increase in the magnitude of the sinusoidal voltage in the resonant circuit. The voltage across the resonant circuit is rectified to obtain the dc voltage $v_o$ as shown in FIG. 2E. The output voltage is smoothed by the filter inductance and capacitance to obtain the output voltage $E_o$. As the frequency supplied to the resonant circuit is lowered, the amount of voltage step up for a given load and a constant current increases.

The average output voltage $E_o$ is always higher than the average dc input voltage $E_{in}$ to the converter, with voltage step up increasing as the frequency goes above or below resonance. The power factor of the load connected to the inverter 6 decreases below unity at higher and lower frequencies than the damped resonant frequency, causing increased step up with decreasing power factor as shown in equation (1).

$$E_{in}=0.9 E'_{ab} I_d \cos \alpha \qquad (1)$$

where $I_d$ is the dc current from the dc current source;

$\cos \alpha$ is the power factor after load attached; to terminals ab; and $E'_{ab}$ is the rms value of fundamental output voltage of the inverter.

The inverter circuit 6 performs similarly to a line commutated inverter (without the disadvantage of operating with a leading load). See Bedford and Hoft's *Principles of Inverter Circuits*, pps. 62-67.

Figure 3:
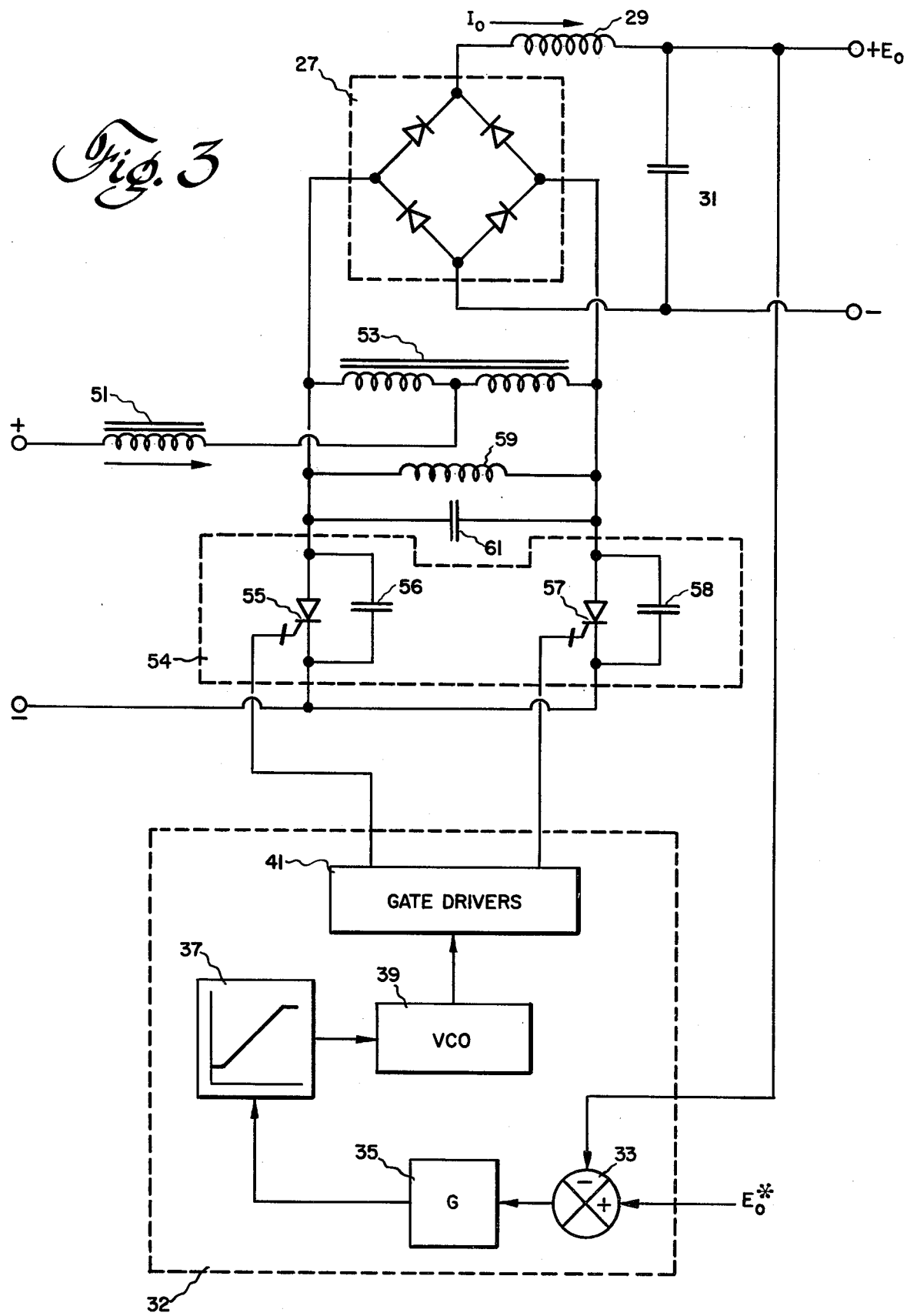
FIG. 3 is another embodiment of a resonant dc-dc converter having a push-pull inverter.

A push-pull version of the circuit of FIG. 1 is shown in FIG. 3. A dc input current obtained from a chopper or phase controlled rectifier (not shown) supplies current through an inductor 51 to the center tap of a center tapped tightly coupled transformer 53. The tight coupling of the transformer can be achieved by bifilar winding. Connected between one end of the transformer 53 and the negative terminal of the current source (not shown) is a switching device and between the other end of the transformer and the negative terminal of the current source (not shown) is another switching device. Both devices have reverse voltage blocking ability and each could be a diode in series with an FET, a diode in series with a bipolar junction transistor or a GTO and form a half bridge inverter 54. A GTO 55 and 57 are shown in the present embodiment. A snubber capacitor 56 is connected across GTO 55 and a snubber capacitor 58 is connected across GTO 57. A resonant circuit is connected across transformer 53 and comprises an inductor 59 in parallel with a capacitor 61. A full bridge diode rectifier 27, filter capacitance 23, and filter inductor 25 are connected across the resonant circuit as in FIG. 1. The control 32 of FIG. 3 is identical to the control 32 of FIG. 1 except that the gate drivers are connected to two GTOs instead of four.

The operation of FIG. 3 is similar to the operation of FIG. 1. Because of the center tapped transformer 53, however, twice the voltage input to the converter is present across the GTOs for the same input voltage. As in FIG. 1 a lagging load is presented to the inverter 54 which in FIG. 3 is comprised of two GTOs 55 and 57. The two GTOs are alternately switched. To commutate the inverter, the incoming GTO is gated on slightly before the outgoing GTO is turned off. The control 31 operates in the same way as in FIG. 1.

Figure 4:
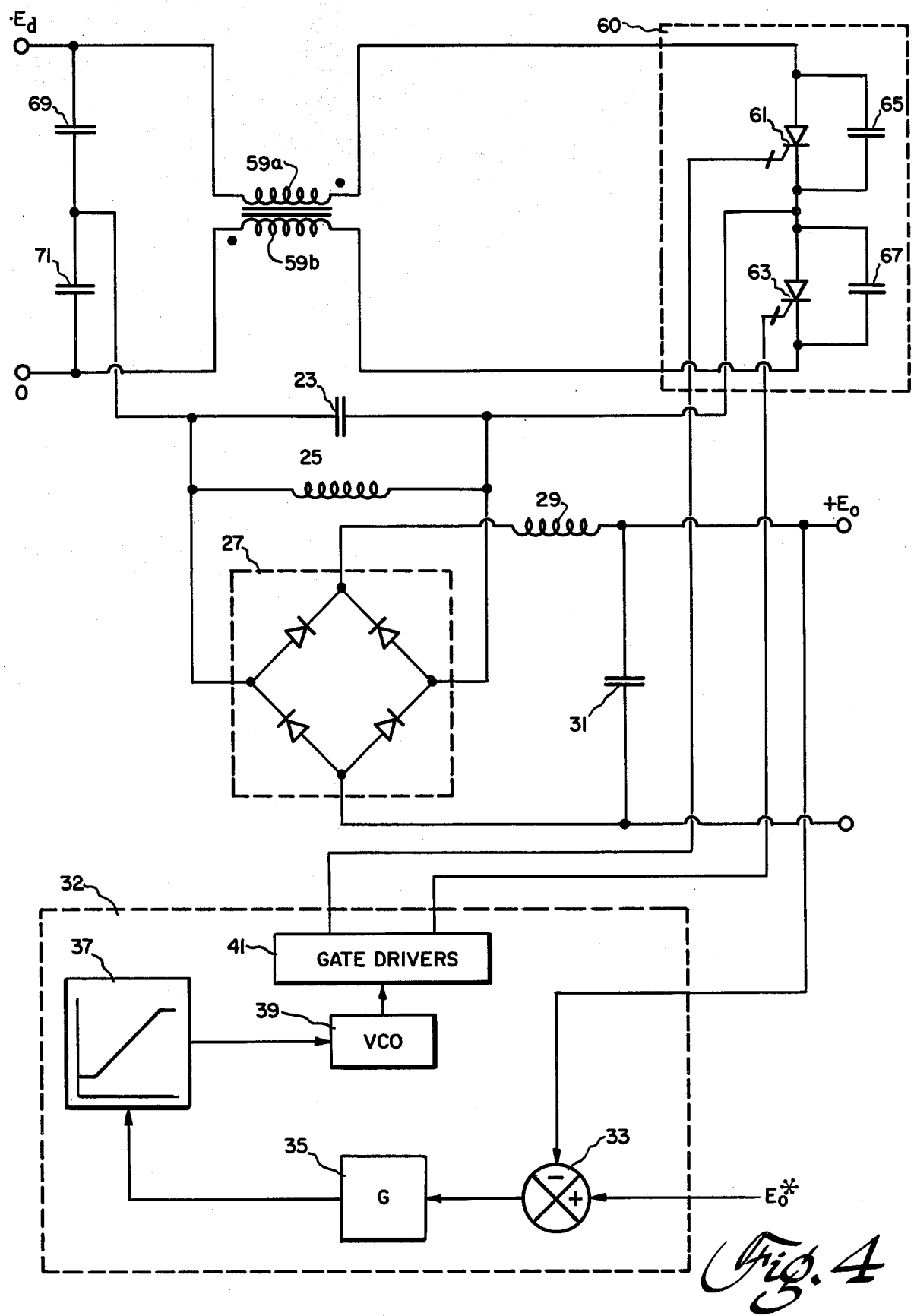
FIG. 4 is still another embodiment of the present invention having a half bridge inverter arrangement.

FIG. 4 shows a half bridge arrangement of the circuit of FIG. 1. A dc input current obtained from a chopper or a phase controlled rectifier (not shown) is connected through a primary winding 59a of a transformer 59 to the positive rail of a half bridge inverter 60 comprised of two switching devices with reverse voltage blocking ability connected in series with one another. The switching devices are shown as GTOs 61 and 63, respectively. A snubber capacitor 65 is connected across GTO 61 and a snubber capacitor 67 is connected across GTO 63. GTO 61 is connected to the primary winding. GTO 63 is connected to negative rail and through the secondary winding 59b of transformer to the negative side of the current source (not shown). The relative polarity of the transformer windings is shown by the dot convention with the ends of the transformer windings with a dot having the same relative polarity. The dotted end of the primary winding 59a is connected to the GTO 61 and the dotted side of the secondary is connected to the negative input terminal. Connected across the positive and negative input terminals are two series connected capacitors 69 and 71. The output of the halfbridge inverter 60 is taken between the series connected GTOs 61 and 63 and the two series connected capacitors 69 and 71. As in FIGS. 1 and 3, a parallel resonant circuit of a capacitor 23 and inductor 25, a full bridge diode rectifier 27 and a filter inducance 29 and capacitance 31 are connected to the output of the inverter.

The operation of the FIG. 4 circuit is similar to that of the FIG. 1 circuit. The transformer provides a path for current that was flowing in a GTO when the GTO is turned off by transferring the current through the transformer 59 to the GTO that is on.

The foregoing describes a high frequency dc-dc converter which can achieve step up operation with greatly reduced switching losses.

While the invention has been particularly shown and described with reference to several preferred embodiments thereof, it will be understood by those skilled in the art that various changes in form and details may be made without departing from the spirit and scope of the invention.

What is claimed is:

1. A resonant dc-dc converter comprising:
   a current input inverter having gate turn off switch means capable of blocking reverse current, said inverter being supplied by an external dc power source and supplying square waves of current;
   a resonant circuit having an inductor connected in parallel with a capacitor, the parallel combination of said inductor and capacitor being coupled to the output of said inverter;
   rectifier means coupled to said resonant circuit to rectify sinusoidal voltage across said resonant circuit to provide a dc output voltage; and
   control means for controlling the dc output voltage by varying the frequency at which said gate turn-off switch means operate, said control means having comparison means for comparing a commanded voltage to the output voltage to develop an error signal, a voltage controlled oscillator coupled to switch means, and limit means for providing a lagging load to said inverter by limiting the error voltage supplied to said voltage controlled oscillator so that the switching frequency of the switch means is at or below the damped resonant frequency of the resonant circuit to reduce switching losses.

2. The converter of claim 1 further including a snubber capacitor coupled across each of said switch means.

3. The converter of claim 1 wherein said current input inverter comprises a full bridge inverter with four gate turn-off switch means.

4. The converter of claim 1 wherein said current input inverter comprises a half bridge inverter including two capacitors connected in series across the inverter input terminals, two series connected gate turn-off switch means with reverse blocking ability, said resonant circuit connected between said series connected capacitors and said series connected switch means, a transformer having a primary winding connected between one capacitor and one switch means and a secondary winding connected between the other capacitor and the other switch means, said transformer winding poled to provide a path for current when each of said switch means alternately turn off.

5. The converter of claim 1 wherein said inverter comprises a push-pull inverter having a center tapped transformer receiving an input current from an external source at its center tap, a first gate turn-off switching means connected between one end of said transformer and the other input terminal and a second gate turnoff switching means connected between the other end of the transformer and said other input terminal, said resonant circuit connected across the ends of said transformer.

6. The converter of claim 2 wherein said gate turn-off switch means with reverse voltage block ability comprises a gate turn off silicon controlled rectifier.

7. The converter of claim 3 wherein said gate turn-off switch means with reverse voltage block ability comprises a gate turn off silicon controlled rectifier.

8. The converter of claim 4 wherein said gate turn-off switch means with reverse voltage blocking ability comprises a gate turn off silicon controlled rectifier.

9. The converter of claim 5 wherein said gate turn-off switch means with reverse voltage block ability comprises a gate turn off silicon controlled rectifier.

* * * * *